(12) United States Patent  
Suzuki

(10) Patent No.: US 8,274,574 B2  
(45) Date of Patent: Sep. 25, 2012

(54) IMAGING APPARATUS FOR OUTPUTTING AN IMAGE SIGNAL ACCORDING TO A SET SHOOTING MODE

(75) Inventor: Yuichi Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 954 days.

(21) Appl. No.: 12/139,141

(22) Filed: Jun. 13, 2008

(65) Prior Publication Data

US 2008/0309776 A1 Dec. 18, 2008

(30) Foreign Application Priority Data

Jun. 14, 2007 (JP) ................................. 2007-157212

(51) Int. Cl.
*H04N 5/225* (2006.01)
*H04N 3/14* (2006.01)
*H04N 5/335* (2006.01)

(52) U.S. Cl. ....................... 348/220.1; 348/294; 348/311

(58) Field of Classification Search ............... 348/220.1, 348/221.1, 230, 230.1
See application file for complete search history.

(56) References Cited

U.S. PATENT DOCUMENTS

| | | | | |
|---|---|---|---|---|
| 5,734,424 A * | 3/1998 | Sasaki | ......................... | 348/222.1 |
| 6,999,119 B1 | 2/2006 | Shibazaki et al. | | |
| 7,012,638 B1 * | 3/2006 | Yokonuma | ................ | 348/220.1 |
| 7,400,353 B2 * | 7/2008 | Hatano | ......................... | 348/308 |
| 2003/0086005 A1 | 5/2003 | Nakamura | | |
| 2003/0090575 A1 * | 5/2003 | Miyamoto | ............... | 348/207.99 |
| 2004/0150733 A1 | 8/2004 | Nagayoshi et al. | | |
| 2005/0062872 A1 * | 3/2005 | Nakashima et al. | .......... | 348/349 |
| 2005/0068455 A1 * | 3/2005 | Hatano | ......................... | 348/345 |
| 2007/0133974 A1 * | 6/2007 | Murakami et al. | ............ | 396/157 |

FOREIGN PATENT DOCUMENTS

| | | |
|---|---|---|
| JP | 06-165099 | 6/1994 |
| JP | 11-298910 | 10/1999 |
| JP | 2001-359038 | 12/2001 |
| JP | 2003-189183 | 7/2003 |
| JP | 2003-219267 | 7/2003 |
| JP | 2005-236511 | 9/2005 |
| JP | 2006-217355 | 8/2006 |
| JP | 2006-320019 | 11/2006 |
| JP | 2007-060131 | 3/2007 |

* cited by examiner

*Primary Examiner* — David Ometz
*Assistant Examiner* — Carramah J Quiett
(74) *Attorney, Agent, or Firm* — Wenderoth, Lind & Ponack, L.L.P.

(57) ABSTRACT

An imaging apparatus having as a shooting mode a normal shooting mode and a continuous shooting mode for generating a plurality of pieces of image data, includes a setting unit operable to set a shooting mode, an imaging element having as a read mode a normal read mode for outputting image signals of all pixels and a mixing read mode for mixing and outputting an image signal of a predetermined pixel and image signals of peripheral pixels of the predetermined pixel, and a pixel mixing controller operable to control the read mode of the imaging element. The pixel mixing controller controls the imaging element to operate in the mixing read mode when the shooting mode is set to the continuous shooting mode.

16 Claims, 7 Drawing Sheets

IMAGING APPARATUS FOR OUTPUTTING AN IMAGE SIGNAL ACCORDING TO A SET SHOOTING MODE

BACKGROUND ART

1. Field of the Invention

The present invention relates to an imaging apparatus capable of performing continuous shooting and more particularly to a high-speed continuous shooting technique for an imaging apparatus including an imaging element with a large number of pixels.

2. Related Art

In recent years, a significant increase in the number of pixels in digital cameras has been made, including small size digital cameras, which have come to the market to include an imaging element with ten to twelve million pixels. Accordingly, even when printing on a sheet of a size of about A3 size, a printing result that is sufficient for viewing can be obtained.

On the other hand, the increase in the number of pixels in the digital camera causes the time required to read out image signals from an imaging element to be longer. This problem becomes prominent particularly in a so-called continuous shooting mode in which continuous shooting is performed on a subject in motion to obtain the best shot. That is, since using an imaging element with a large number of pixels it takes time to read out image signals from the imaging element, it becomes difficult to perform high-speed continuous shooting, increasing the possibility of missing the best shot.

To solve the above-described problem, a digital still camera described in JP-A-2003-219267 is proposed. The digital still camera described in JP-A-2003-219267 thins horizontal lines when reading out image signals from an imaging element, achieving fast readout. This enables high-speed continuous shooting in a digital still camera using an imaging element with a large number of pixels.

However, since the digital still camera described in JP-A-2003-219267 thins horizontal lines when reading out image signals from the imaging element, there is a problem that the image quality of a shot image is degraded.

The present invention is directed to solve the above-described problems and an object of the present invention is therefore to provide an imaging apparatus can suppress degradation in the image quality of a shot image in high-speed continuous shooting.

SUMMARY OF THE INVENTION

In a first aspect of the invention, provided is an imaging apparatus having, as a shooting mode, a normal shooting mode for generating one piece of image data in response to a single shooting instruction, and a continuous shooting mode for generating a plurality of pieces of image data in response to a single shooting instruction. The imaging apparatus includes a setting unit operable to set a shooting mode; an imaging element including a plurality of pixels, and having, as a read mode, a normal read mode for outputting image signals of all pixels and a mixing read mode for mixing and outputting an image signal of a predetermined pixel and image signals of peripheral pixels of the predetermined pixel; and a pixel mixing controller operable to control the read mode of the imaging element. The pixel mixing controller controls the imaging element to operate in the mixing read mode when the shooting mode is set to the continuous shooting mode.

In a second aspect of the invention, provided is an imaging apparatus having, as a shooting mode, a normal shooting mode for generating one piece of image data in response to a single shooting instruction, and a continuous shooting mode for generating a plurality of pieces of image data in response to a single shooting instruction. The imaging apparatus includes: a setting unit operable to set a shooting mode; an imaging element including a plurality of pixels, and having, as a read mode, a normal read mode for outputting image signals of all pixels and a mixing read mode for mixing and outputting an image signal of a predetermined pixel and image signals of peripheral pixels of the predetermined pixel; and a pixel mixing controller operable to control the read mode of the imaging element. The continuous shooting mode includes a normal continuous shooting mode and a high-speed continuous shooting mode in which a more pieces of image data than that in the normal continuous shooting mode are generated per unit time in response to a single shooting instruction. The pixel mixing controller controls the imaging element to operate in the normal read mode when the shooting mode is set to the normal continuous shooting mode, and operate in the mixing read mode when the shooting mode is set to the high-speed continuous shooting mode.

In a third aspect of the invention, provided is an imaging apparatus having, as a shooting mode, a normal shooting mode for generating one piece of image data in response to a single shooting instruction, and a continuous shooting mode for generating a plurality of pieces of image data in response to a single shooting instruction. The imaging apparatus includes: a setting unit operable to set a shooting mode; an imaging element including a plurality of pixels, and having, as a read mode, a normal read mode for outputting image signals of all pixels and a mixing read mode for mixing and outputting an image signal of a predetermined pixel and image signals of peripheral pixels of the predetermined pixel; and a pixel mixing controller operable to control the read mode of the imaging element. The pixel mixing controller can switch the read mode of the imaging element to one of the mixing read mode and the normal read mode according to the instruction set by the setting unit, when the shooting mode is set to the continuous shooting mode.

According to the present invention, upon shooting in continuous shooting mode, the read mode of an imaging element is switched to a mixing read mode in which image signals of a plurality of pixels are mixed and read out. In the mixing read mode, while the image signals mixed and read out include information on the image signals of the plurality of pixels, the amount of image signals to be read out decreases. Accordingly, even when high-speed continuous shooting is performed, degradation in the image quality of a shot image can be suppressed.

DETAILED DESCRIPTION OF THE INVENTION

An embodiment of the present invention will be described below with reference to the accompanying drawings.

1. Configuration

Figure 1:
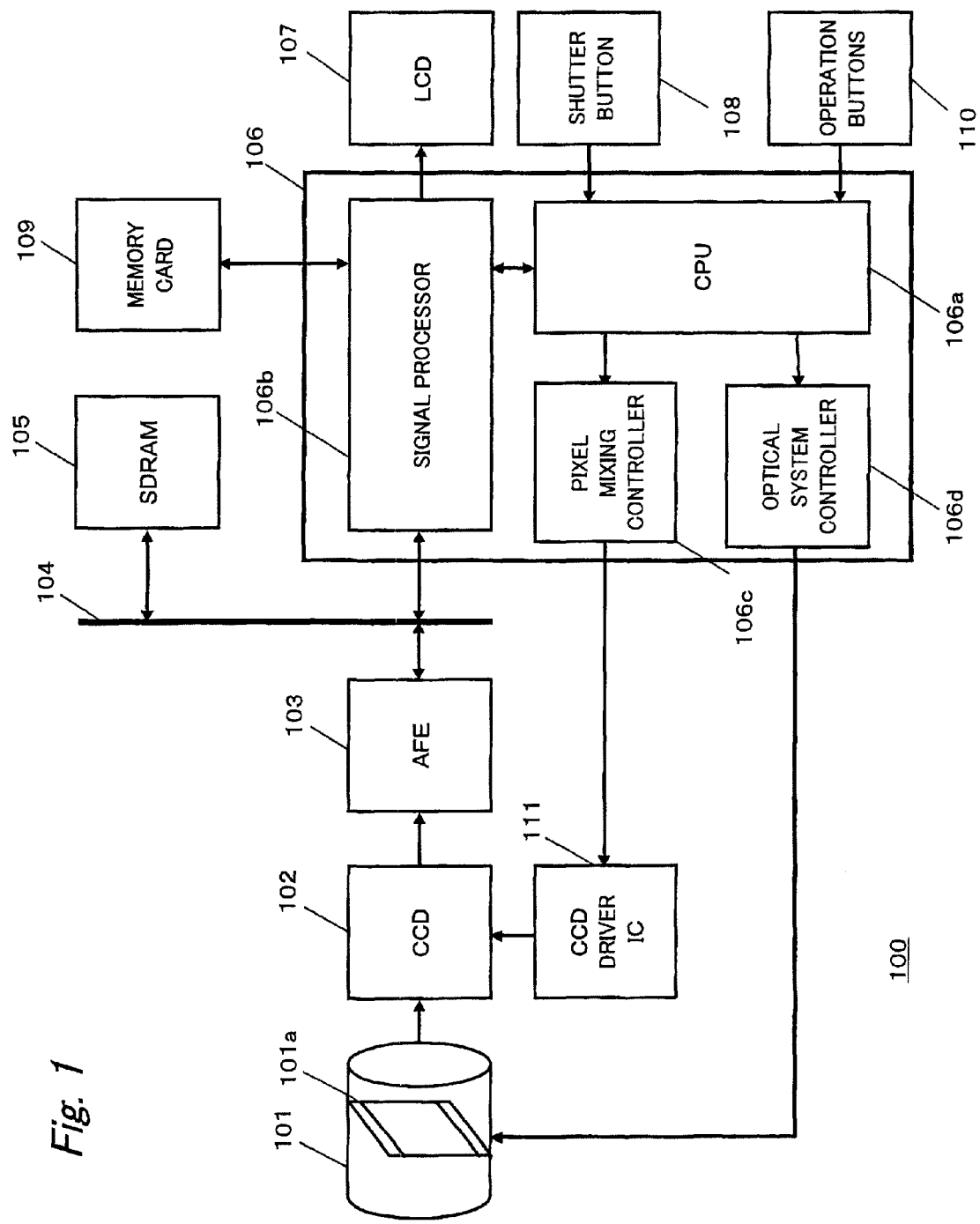
FIG. 1 is a diagram showing a configuration of a digital camera which is one embodiment of the present invention.

FIG. 1 is a block diagram of a digital camera which is one embodiment of an imaging apparatus according to the present invention. A digital camera 100 includes an optical system 101 that receives optical information from a subject, a CCD 102 that converts the optical information into an electrical image signal, a signal processing LSI 106 that processes the image signal generated from the optical information, an LCD 107 that displays various information, and various operation buttons 108 and 110 manipulated by a user for various operations.

The optical system 101 forms an image of the subject on the CCD 102. The optical system 101 includes a plurality of lens (not shown) and a mechanical shutter 101a. The mechanical shutter 101a is a mechanism component that controls the exposure time of the CCD 102 by allowing or not allowing optical information including an image of the subject to arrive at the CCD 102. An electronic shutter for electronically controlling exposure time of the CCD 102 is used together with the mechanical shutter 101a to control the exposure time of the CCD 102 with high resolution.

The CCD 102 includes a plurality of pixels and outputs an image signal corresponding to the subject image formed on the CCD 102. An AFE (Analog Front End) 103 converts the image signal which is an analog signal and outputted from the CCD 102 into image data which is digital signals and stores the image data in an SDRAM 105 via a bus 104. The AFE 103 is an LSI including, for example, a CDS (Correlated Double Sampling) circuit that removes a noise component of an image signal, an AGC (Automatic Gain Control) amplifier that adjusts the magnitude of the image signal, and an A/D converter that converts an analog signal into a digital signal (none of them are shown).

The signal processing LSI 106 includes a CPU 106a, a signal processing unit 106b, a pixel mixing controller 106c, and an optical system controller 106d. The CPU 106a totally controls the signal processing LSI 106 according to instructions stored in a ROM (not shown) in the signal processing LSI 106. The signal processor 106b converts the image data which is stored in the SDRAM 105 by the AFE 103 into display data suitable for display on the LCD 107 and outputs the display data to the LCD 107. A period during which the subject image formed on the CCD 102 is continuously outputted to the LCD 107 is called the "monitoring period".

Upon press of the shutter button 108, a shooting operation of the digital camera 100 is activated. The optical system controller 106d allows the subject image to be exposed to the CCD 102 using both the mechanical shutter 101a and the electrical shutter. This period is called the "exposure period". When the exposure period ends, image signals stored in the CCD 102 are read out. This period is called the "readout period". When the image data which is stored in the SDRAM 105 by the AFE 103 is image data shot by pressing the shutter button 108, the signal processor 106b converts the image data to data in a recording data format and records the converted data to a memory card 109.

The CCD 102, the LCD 107, and other circuits operate in synchronization with a clock generated by a timing generator (TG) (not shown). Particularly, during the monitoring period, the CCD 102 and the LCD 107 are updated every 30 seconds and the update timings of them synchronize with each other. A signal that generates update timing of information in the CCD 102 is called "CCDVD" and a signal that generates update timing of information in the LCD 107 is called "LCDVD".

The AFE 103 and the signal processing LSI 106 may be configured by a single LSI. The pixel mixing controller 106c may be included in the signal processor 106b or the CPU 106a may implement the function of the pixel mixing controller 106c. Note that the CCD 102 corresponds to an imaging element of the present invention. The AFE 103 corresponds to a signal processing unit of the present invention. The operation button 110 corresponds to an operation unit of the present invention. The pixel mixing controller 106c corresponds to a pixel mixing controller of the present invention.

2. Operation 2.1 Shooting Mode

The digital camera 100 has a plurality of shooting modes which can be switched by the operation button 110. The shooting modes include a "normal shooting mode" and a "continuous shooting mode". The normal shooting mode is a mode in which a single shot image is obtained by one press of the shutter button 108. The continuous shooting mode is a mode in which a plurality of continuous shot images are obtained while the shutter button 108 is being pressed, and contains a "normal continuous shooting mode" and a "high-speed continuous shooting mode". The normal continuous shooting mode is a mode in which a plurality of continuous shot images are obtained at a relatively low speed while the shutter button 108 is being pressed. The high-speed continuous shooting mode is a mode in which a plurality of continuous shot images are obtained at a relatively high speed while the shutter button 108 is being pressed. For example, the normal continuous shooting mode can generate four pieces of image data per second, while the high-speed continuous shooting mode can generate ten pieces of image data per second.

2.2 Read Mode of CCD

The CCD 102 of the present embodiment has a plurality of read modes. One of read modes in which an image signal is read out for each pixel is called the "normal read mode". The CCD 102 of the present embodiment further has a "mixing read mode" in which image signals of a plurality of pixels are mixed and read out, in addition to the normal read mode. The number of pixels to be mixed in the mixing read mode can be externally set on the imaging element. In the present embodiment, the mixing read mode includes a "9-pixel mixing read mode" and a "3-pixel mixing read mode". When image signals of a plurality of pixels are mixed and read out, while the image signals mixed and read out include information on mixed image signals of peripheral pixels, the amount of image signals to be read out can be reduced. By this configuration, the readout period can be reduced while suppressing degradation in the image quality of a shot image. The pixel mixing controller 106c sends a drive signal to a CCD drive IC 111 to instruct to change the number of pixels to be mixed. Each read mode is described below.

(1) Normal Read Mode

Figure 2B:
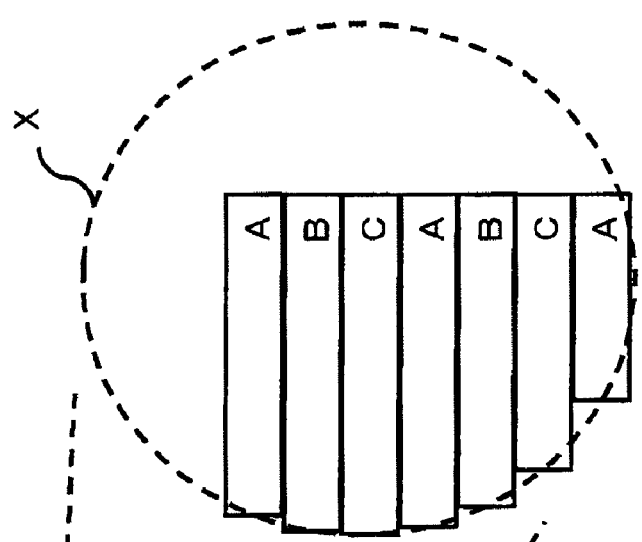
FIGS. 2A and 2B are conceptual diagrams showing a configuration of a CCD including a number of horizontal lines.
Figure 2A:
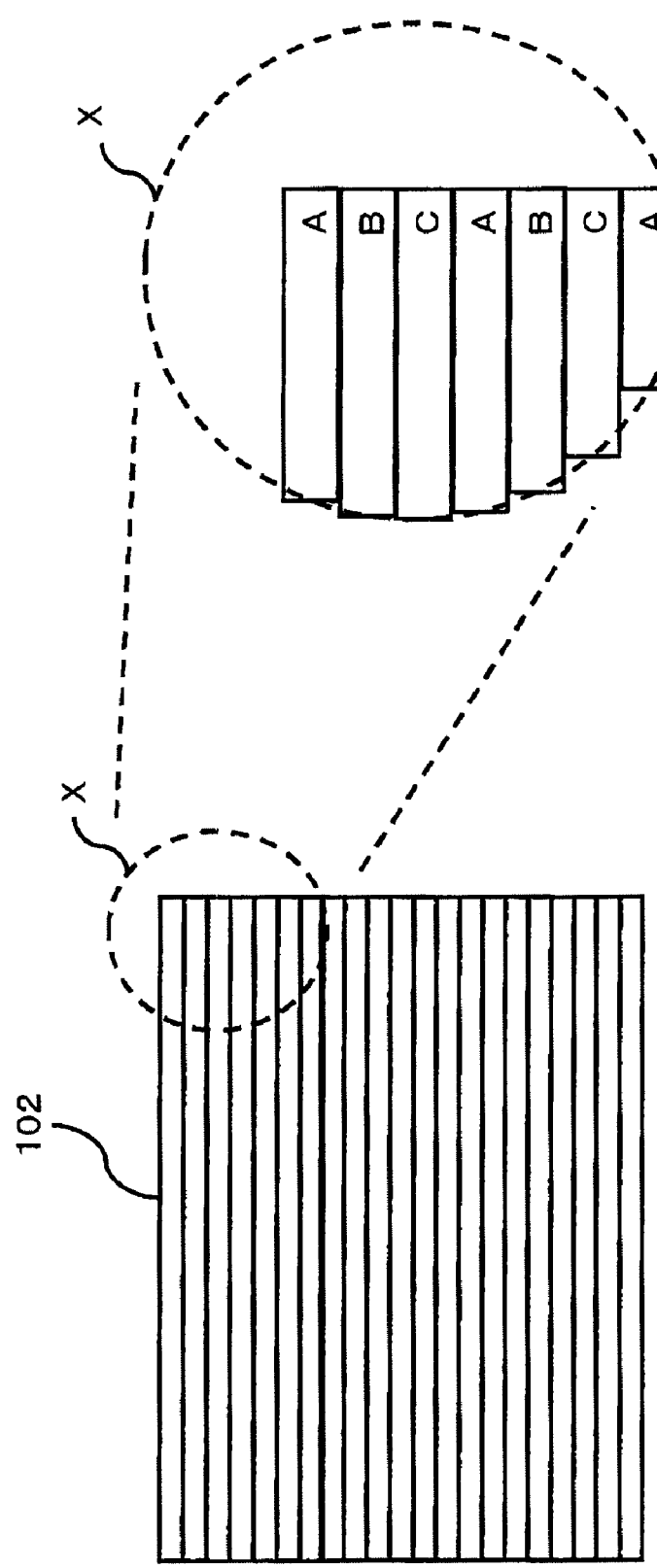

With reference to FIGS. 2A and 2B, readout of the image signal from the CCD 102 in the normal read mode is described. As shown in FIG. 2A, the CCD 102 includes a plurality of horizontal lines each of which contains a number of pixels (not shown). FIG. 2B is an enlarged view of a dashed-line circle X shown in FIG. 2A. The horizontal lines of the CCD 102 are divided into three groups, A, B, and C, every three lines and image signals are read out from each group. Specifically, first, image signals of pixels in horizontal lines belonging to the group A are read out, and thereafter, image signals of pixels in horizontal lines belonging to the groups B and C are sequentially read out. Image signals of all pixels of the CCD 102 are read out by reading the image signals of the three groups.

(2) 9-Pixel Mixing Read Mode

Figure 3:
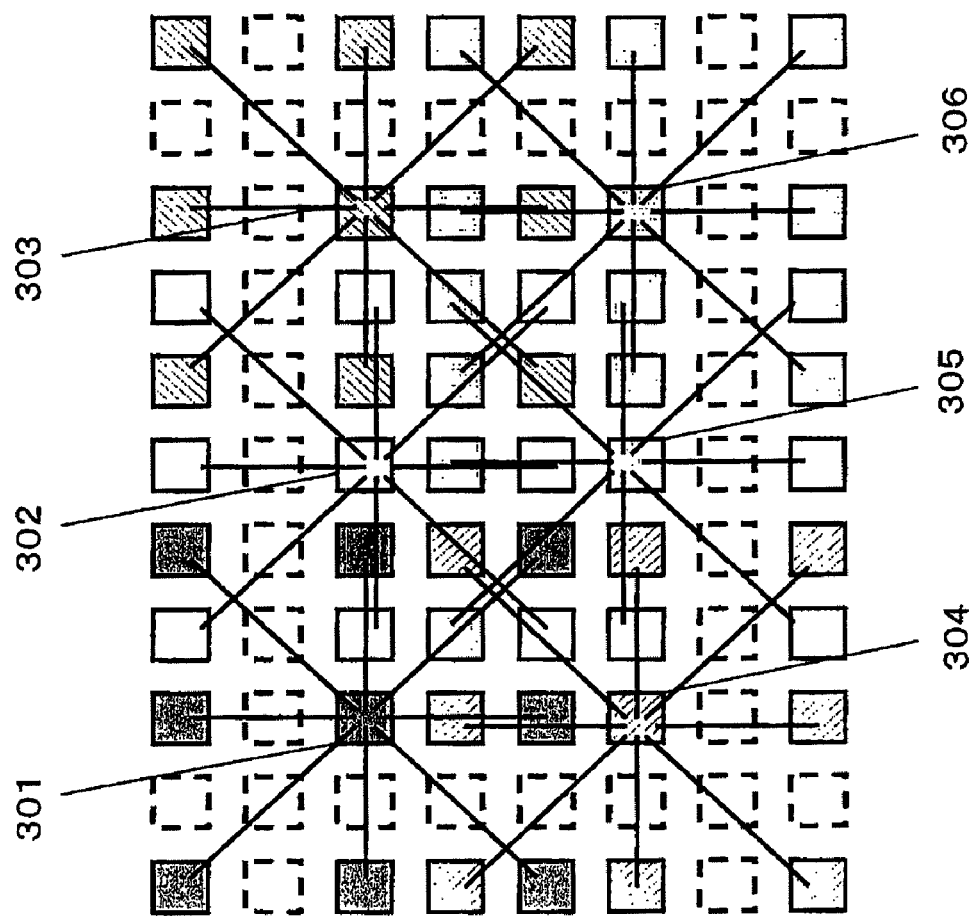
FIG. 3 is a diagram showing an example of a pixel combination for a 9-pixel mixing readout.

The 9-pixel mixing read mode is a mode in which image signals of nine pixels are mixed and read out. FIG. 3 shows an example of a pixel combination for a 9-pixel mixing readout. In the case of the example in the drawing, with each of pixels 301 to 306 being at the center, image signals of eight peripheral pixels located at locations away from each central pixel by two pixels in up, down, left, right, and diagonal directions are mixed with an image signal of the corresponding one of central pixels 301 to 306. The mixed image signals are read out as the image signal of the corresponding pixel 301 to 306, respectively. For example, regarding the pixel 301, image signals of eight peripheral pixels which are connected to the pixel 301 with straight lines and which are added with the same hatching pattern as that of the pixel 301 are mixed with an image signal of the pixel 301. Thereafter the mixed signal is read out as the image signal of the pixel 301. The same also applies to the pixels 302 to 306 and other pixels.

(3) 3-Pixel Mixing Read Mode

Figure 4:
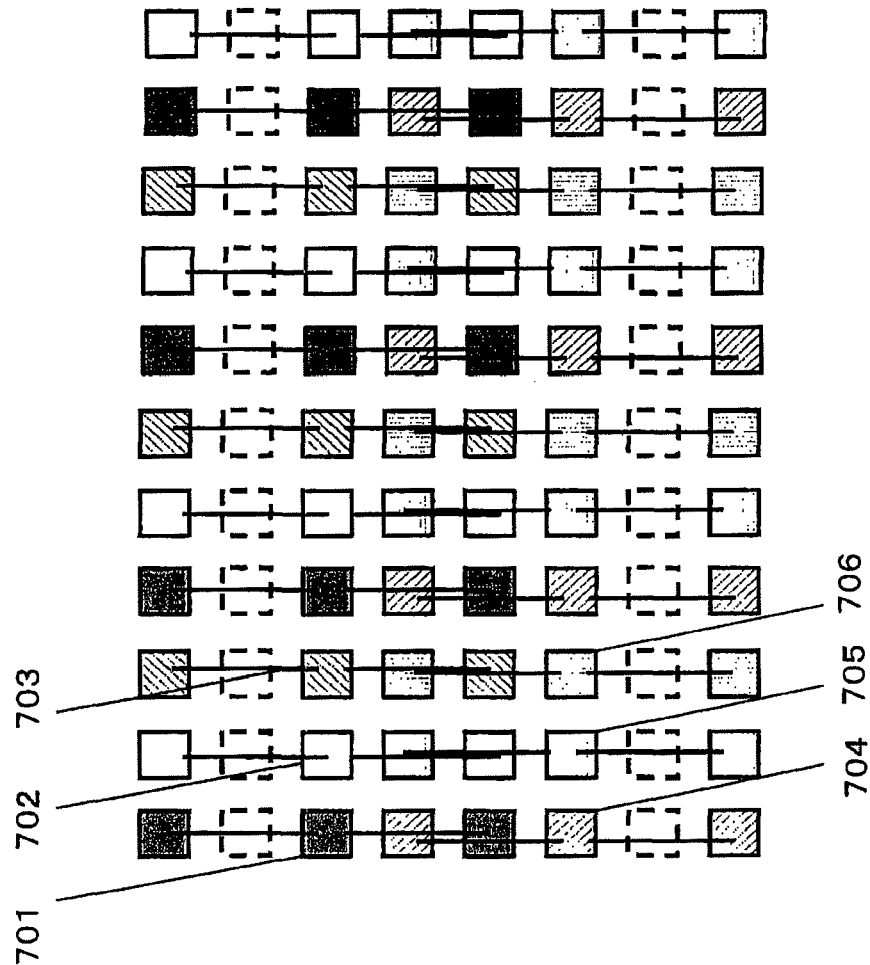
FIG. 4 is a diagram showing an example of a pixel combination for a 3-pixel mixing readout.

The 3-pixel mixing read mode is a mode in which image signals of three pixels are mixed and read out. FIG. 4 shows an example of a pixel combination for a 3-pixel mixing readout. In the case of the example in the drawing, with each of pixels 701 to 706 being at the center, image signals of two pixels away from each central pixel by two pixels in up and down directions are mixed with an image signal of the corresponding one of central pixels 701 to 706. The mixed image signals are read out as the image signal of the corresponding pixel 701 to 706, respectively. For example, regarding the pixel 701, image signals of two peripheral pixels which are connected to the pixel 701 with straight lines and which are added with the same hatching pattern as that of the pixel 701 are mixed with an image signal of the pixel 701. Thereafter the mixed signal is read out as the image signal of the pixel 701. The same also applies to the pixels 702 to 706 and other pixels. The 3-pixel mixing readout can be realized by, for example, driving the CCD 102 so as to mix pixels at VCCD upon vertical transfer and not to mix pixels at HCCD upon horizontal transfer, during readout of charge from the CCD 102.

The 9-pixel mixing readout enables high-speed continuous shooting about nine times as fast as the normal continuous shooting mode, while suppressing degradation in the image quality of a shot image. On the other hand, the 3-pixel mixing readout enables high-speed continuous shooting about three times as fast as the normal continuous shooting mode, while suppressing more degradation in the image quality of a shot image. That is, increase of the number of pixels to be mixed reduces the amount of image signals to be read out, enabling higher-speed continuous shooting. On the other hand, decrease of the number of pixels to be mixed increases the amount of image signals to be read out relatively, but enables continuous shooting where degradation in image quality to be further suppressed.

2.3 Switching of Read Modes

Switching between the read modes of the CCD 102 in the digital camera 100 of the present embodiment is described. Switching of the read modes is performed by the pixel mixing controller 106c according to instructions from the CPU 106a.

In the present embodiment, the read mode of the CCD 102 is switched according to the shooting mode, as shown in Table 1. Specifically, the read mode is set to the normal read mode in the normal shooting mode and the normal continuous shooting mode, and the read mode is set to the mixing read mode (the 9-pixel mixing read mode or the 3-pixel mixing read mode) in the high-speed continuous shooting mode. By thus switching the read mode of the CCD 102 in the high-speed continuous shooting mode to the mixing read mode, readout of image signals can be achieved for high-speed shooting and degradation in the image quality of a shot image can be suppressed.

TABLE 1

| Shooting Mode | Read Mode |
|---|---|
| Normal shooting mode | Normal read mode |
| Normal continuous shooting mode | Normal read mode |
| High-speed continuous shooting mode | Mixing read mode (9-pixel mixing readout or 3 pixel mixing readout) |

The number of pixels to be mixed in the mixing read mode which is executed in the high-speed continuous shooting mode may be specified by the user through the operation button 110 or may be fixed upon manufacturing of the digital camera 100. Alternatively, the number of pixels to be mixed may be changed according to the amount of exposure with the default value of the number of pixels to be mixed set to nine. Specifically, the pixel mixing controller 106c may determine the amount of exposure, and change the number of pixels to be mixed to three when determining that a 9-pixel mixing readout may cause overexposure. Note that the amount of exposure can be determined, for example, from the brightness of a subject image. Specifically, when the subject is bright, the number of pixels of which image signals are to be mixed may be reduced to avoid overexposure caused by the mixing of image signals. When the subject is dark, the number of pixels of which image signals are to be mixed may be increased to avoid underexposure. During the high-speed continuous shooting mode, the read mode may be further switched also to the normal read mode by the operation button 110.

Furthermore, the continuous shooting speed in the high-speed continuous shooting mode may be changed with the operation button 110. For example, it may be configured such that during the high-speed continuous shooting mode, a selection can be made with the operation button 110 between a first continuous shooting speed at which 10 pieces of image data can be generated per second and a second continuous shooting speed at which 15 pieces of image data can be generated per second. A high-speed continuous shooting mode at the first continuous shooing speed is referred to as the "high-speed continuous shooting mode L", while a high-speed continuous shooting mode at the second continuous shooting speed is referred to as the "high-speed continuous shooting mode H". When the high-speed continuous shooting mode L is selected, the read mode may be switched to the 3-pixel mixing read mode, and when the high-speed continuous shooting mode H is selected, the read mode may be switched to the 9-pixel mixing read mode. For the user, selecting the number of image data that can be generated per second is more intuitively understood and provides better usability than selecting the number of peripheral pixels to be mixed.

2.4 Operation in Normal Continuous Shooting Mode (+ the Normal Read Mode)

Figure 5:
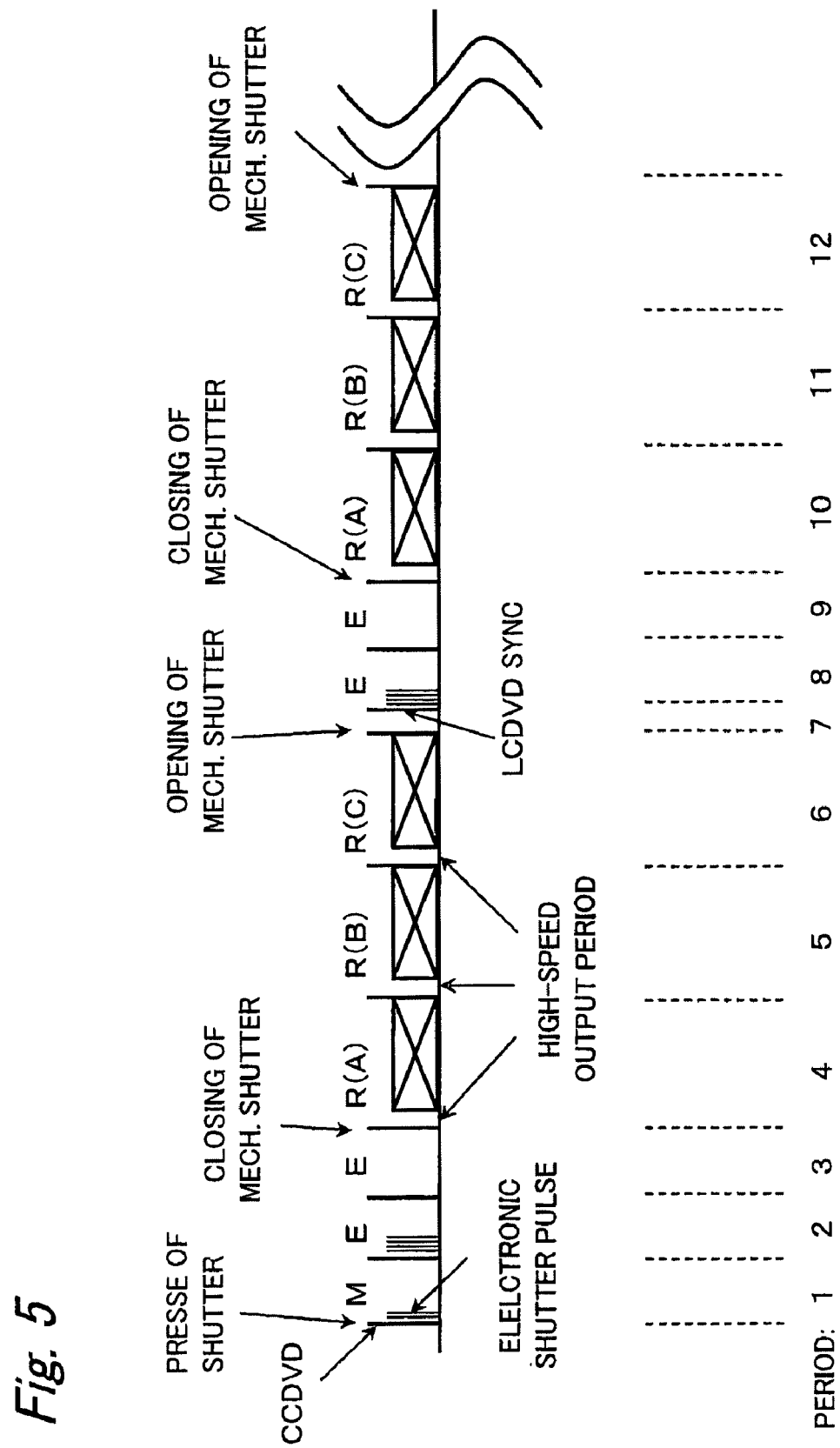
FIG. 5 is a timing chart showing an example of a shooting operation in normal continuous shooting mode (and normal read mode).

FIG. 5 is a timing chart showing an example of a shooting operation in the normal continuous shooting mode. In the normal continuous shooting mode, referring to Table 1, the read mode of the CCD 102 is set to the normal read mode.

Note that the normal shooting mode is also similarly treated by considering that in FIG. 5 at least one monitoring period M is further inserted between periods 7 and 8 and the shutter button 108 is pressed during the last inserted monitoring period M.

Period 1 is a monitoring period M, of which length is 1/30 second. During the monitoring period M, the mechanical shutter 101a is being opened. When an exposure time of 1/30 second may cause overexposure due to the bright subject, the exposure time of the CCD 102 is limited by the electronic shutter. In FIG. 5, during the period 1, the shutter button 108 is pressed.

Periods 2 and 3 are exposure periods E for obtaining a shot image, of which lengths are 1/30 second respectively. During the exposure period E, the mechanical shutter 101a is being opened. In FIG. 5, since the exposure time required for shooting is determined to be 1/30 second or more and less than 1/15 second, the periods 2 and 3 are set to the exposure periods E and during the period 2 the exposure time of the CCD 102 is limited by the electronic shutter. Note that when the exposure time required for shooting is determined to be less than 1/30 second, only the period 2 may be set to the exposure period E and the exposure time of the CCD 102 may be limited by the electronic shutter. When the period 3 ends, the mechanical shutter 102a is closed by the optical system controller 106d in preparation for beginning a readout period R(A).

Periods 4 to 6 are readout periods R(A), R(B), and R(C) and the length of each period is determined based on the speed at which the CCD 102 outputs the image signal (the total number of pixels of the CCD 102 or the drive frequency of the CCD 102). During the normal shooting mode and the normal continuous shooting mode, the pixel mixing controller 106c does not mix and read out image signals of a plurality of pixels, as mixing read mode. But it does request the CCD drive IC 111 for the normal read mode in which image signals of all pixels are individually read out. The CCD drive IC 111 drives the CCD 102 in response to the request. During the readout periods R(A), R(B), and R(C), the mechanical shutter 102a is being closed so that new image signals are not accumulated in the CCD 102.

The period 4 shown in FIG. 5 is the readout period R(A) during which only image signals of horizontal lines denoted by "A" in FIG. 2B are read out. Similarly, the period 5 is the readout period R(B) during which only image signals of horizontal lines denoted by "B" in FIG. 2B are read out. The period 6 is the readout period R(C) during which only image signals of horizontal lines denoted by "C" in FIG. 2B are read out. Such a readout scheme is called "3-field drive". Reading out all image signals of the CCD 102 in the above-described manner requires the time from the period 4 to the period 6. Note that at the beginning of each of the periods 4 to 6 the residual charge in the vertical transfer lines is discharged at a high speed. In this way, an improvement in the image quality of a shot image is achieved. The above-described operation provides image signals for the first image.

Period 7 is a period for synchronizing the CCDVD and the LCDVD. As described above, the lengths of the periods 4 to 6 are determined based on the speed at which the CCD 102 outputs the image signal. On the other hand, the LCDVD is updated in a cycle of 1/30 second even during the periods 4 to 6. Therefore, at the end of the period 6, normally, the CCDVD is not synchronized with the LCDVD. Hence, the CCDVD is synchronized with the first LCDVD occurring after the period 6 ends. After the period 6 ends, in preparation for beginning an exposure period E for the second image, the mechanical shutter 102a needs to be opened by the optical system controller 106d but the period 7 also has a purpose of waiting for the mechanical shutter 102a to be completely opened. The period 7 can be removed if it is not necessary.

After the period 7, the operation transitions to a shooting operation for the second image. The operations performed during periods 8 to 12 are the same as those during the periods 2 to 6. When the period 12 ends, the image signal for the second image is obtained. Thereafter, while the shutter button 108 is pressed, shooting is repeated. Note that when the normal shooting mode is selected by an operation on the operation button 110, a shooting operation ends at the period 7 and thereafter the operation returns to a monitoring period M.

2.5 Operation in High-Speed Continuous Shooting Mode (+ the 9-Pixel Mixing Read Mode)

Figure 6:
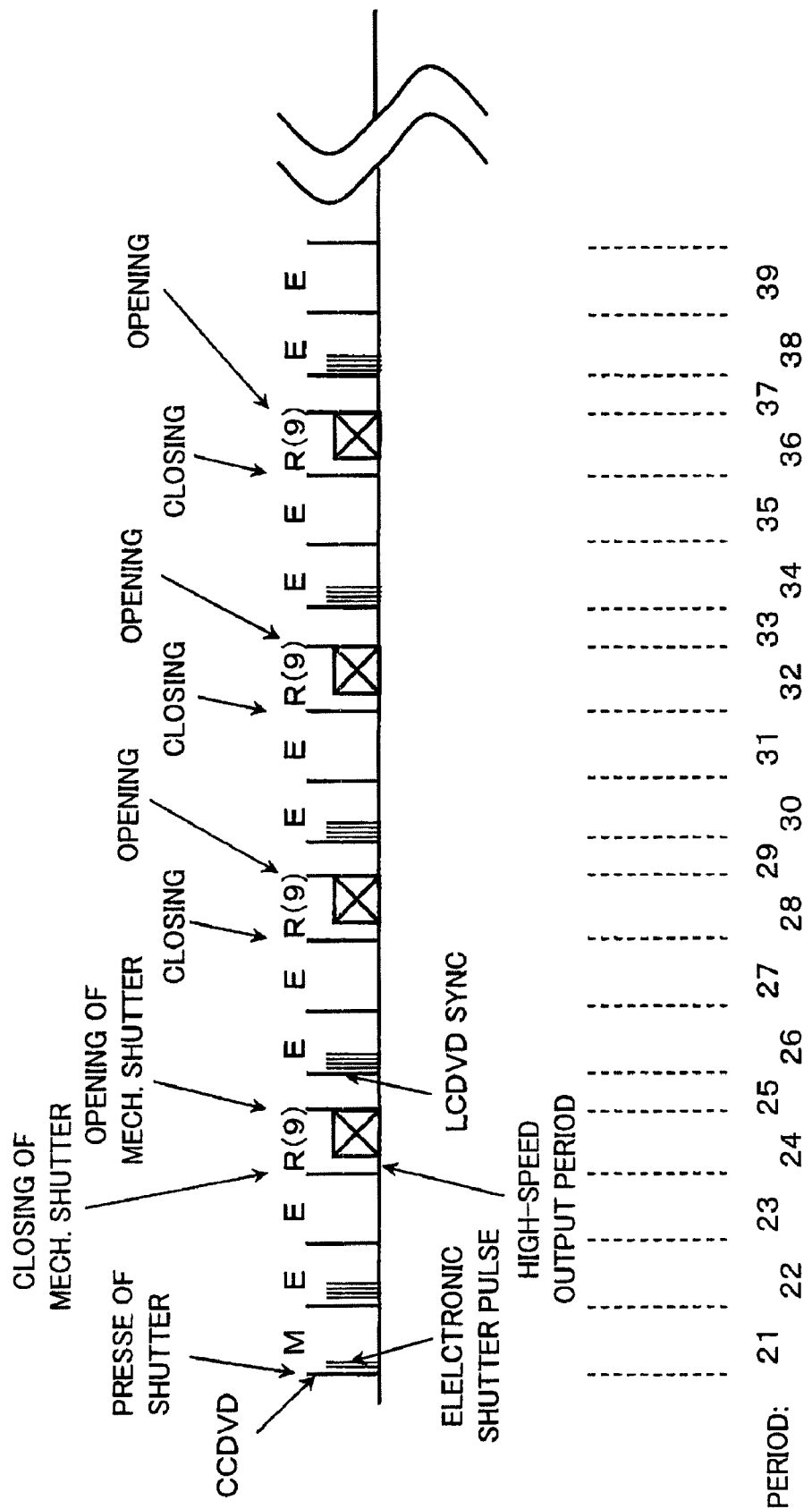
FIG. 6 is a timing chart showing an example of a shooting operation in high-speed continuous shooting mode (and 9-pixel mixing read mode).

FIG. 6 is a timing chart showing an example of a shooting operation in the high-speed continuous shooting mode (the continuous shooting mode of the present invention). Here, it is assumed that the read mode of the CCD 102 in the high-speed continuous shooting mode is set to the 9-pixel mixing read mode. Period 21 is a monitoring period M which is the same as the period 1 in the normal continuous shooting mode (or the normal shooting mode) shown in FIG. 5, and thus, description thereof is omitted. Periods 22 and 23 are exposure periods E which are the same as the periods 2 and 3 in the normal continuous shooting mode (or the normal shooting mode) shown in FIG. 5, respectively, and thus, description thereof is omitted. When the period 23 ends, the mechanical shutter 102a is closed by the optical system controller 106d in preparation for beginning a readout period R(9).

Period 24 is the readout period R(9) and the length thereof is determined according to the speed at which the CCD 102 outputs the image signal. The pixel mixing controller 106c requests the CCD drive IC 111 for the 9-pixel mixing read mode (an example of the mixing read mode of the present invention) in which an image signal of a certain pixel of the CCD 102 is mixed with image signals of eight peripheral pixels thereof and the mixed image signal is outputted. The CCD drive IC 111 drives the CCD 102 according to the request. Hence, the amount of image signals is 1/9. Accordingly, the length of the readout period R(9) is 1/9 of the total length of the readout periods R(A), R(B), and R(C) in the normal continuous shooting mode (or the normal shooting mode). During the readout period R(9), the mechanical shutter 102a is being closed so that new image signals are not accumulated in the CCD 102. At the beginning of the period 24 the residual charge in the vertical transfer lines is discharged at a high speed. In this way, an improvement in the image quality of a shot image is achieved. By the above-described operation, image signals for the first image are obtained. When the period 24 ends, the mechanical shutter 102a is opened by the optical system controller 106d, in preparation for beginning an exposure period E for the second image.

Although during the normal shooting mode and normal continuous shooting mode illustrated in FIG. 5 the 3-field drive is performed, generally, the 9-pixel mixing readout is achieved by 1-field drive. Therefore, during the high-speed continuous shooting mode, only R(9) is provided as a readout period, as shown in FIG. 6.

When image signals of a plurality of pixels (nine pixels here) are mixed and read out, an image signal of each pixel is increased by an amount corresponding to the number of mixed pixels and thus the same effect as that obtained when the exposure time is increased can be obtained. Hence, the exposure time is reduced or an aperture mechanism (not shown) is closed in the optical system 101 to avoid overexposure. Such a pixel mixing readout allows not only the readout period but also the exposure time to be reduced.

If the exposure time for obtaining correct exposure can be shortened, it may be possible to shorten the exposure period E by integral multiples of 1/30 second. For example, even though a subject has an exposure time for shooting which is 1/30 second or more and less than 1/15 second and an exposure period E of 2×CCDVD (1/15 second) during the normal continuous shooting mode, the subject may have the exposure time for shooting less than 1/30 second and the exposure period E of 1×CCDVD (1/30 second) to ensure sufficient correct exposure during the high-speed continuous shooting mode. Change in the exposure period E from 2×CCDVD (1/15 second) to 1×CCDVD (1/30 second) allows the time interval between one readout period R(9) and the next readout period R(9) to be reduced, producing an effect of reducing a continuous shooting interval.

On the other hand, for a subject which has an exposure time for shooting during the normal continuous shooting mode less than 1/30 second and an exposure period E ending at 1×CCDVD (1/30 second), although 1×CCDVD (1/30 second) is required as the exposure period E during the high-speed continuous shooting mode, the exposure time can be reduced by control of the electronic shutter than the exposure time in the normal continuous shooting mode. Reduction of the exposure time by the electronic shutter causes an effect of being able to suppress camera shake and subject shake. Note that although FIG. 3 shows an example in which an image signal of a certain pixel is mixed with image signals of eight peripheral pixels thereof and then the mixed image signal is read out, the number of pixels of which image signals are to be mixed can be changed.

Period 25 is a period for synchronizing the CCDVD and the LCDVD, which is the same as the period 7 shown in FIG. 5, and thus, description thereof is omitted. Periods 26 to 28 are the same as the periods 22 to 24, and when the period 28 ends, image signals for the second image are obtained. Thereafter, while the shutter button 108 is being pressed, shooting is repeated.

2.6 Another Exemplary Operation in High-Speed Continuous Shooting Mode (+3-Pixel Mixing Read Mode)

Below, the case is described in which the read mode of the CCD 102 in the high-speed continuous shooting mode (the continuous shooting mode of the present invention) is set to the 3-pixel mixing read mode. In the 9-pixel mixing readout mode, an image signal of a central pixel is mixed with image signals of eight pixels located in up, down, left, right, and diagonal directions thereof. On the other hand, in the 3-pixel mixing readout mode, an image signal of a central pixel is mixed with image signals of only two pixels located in up and down directions thereof and then the mixed image signal is read out, and thus, image signals of pixels located in left, right, and diagonal directions thereof are not mixed. Accordingly, a shot image with higher resolution in the left and right directions can be obtained.

Figure 7:
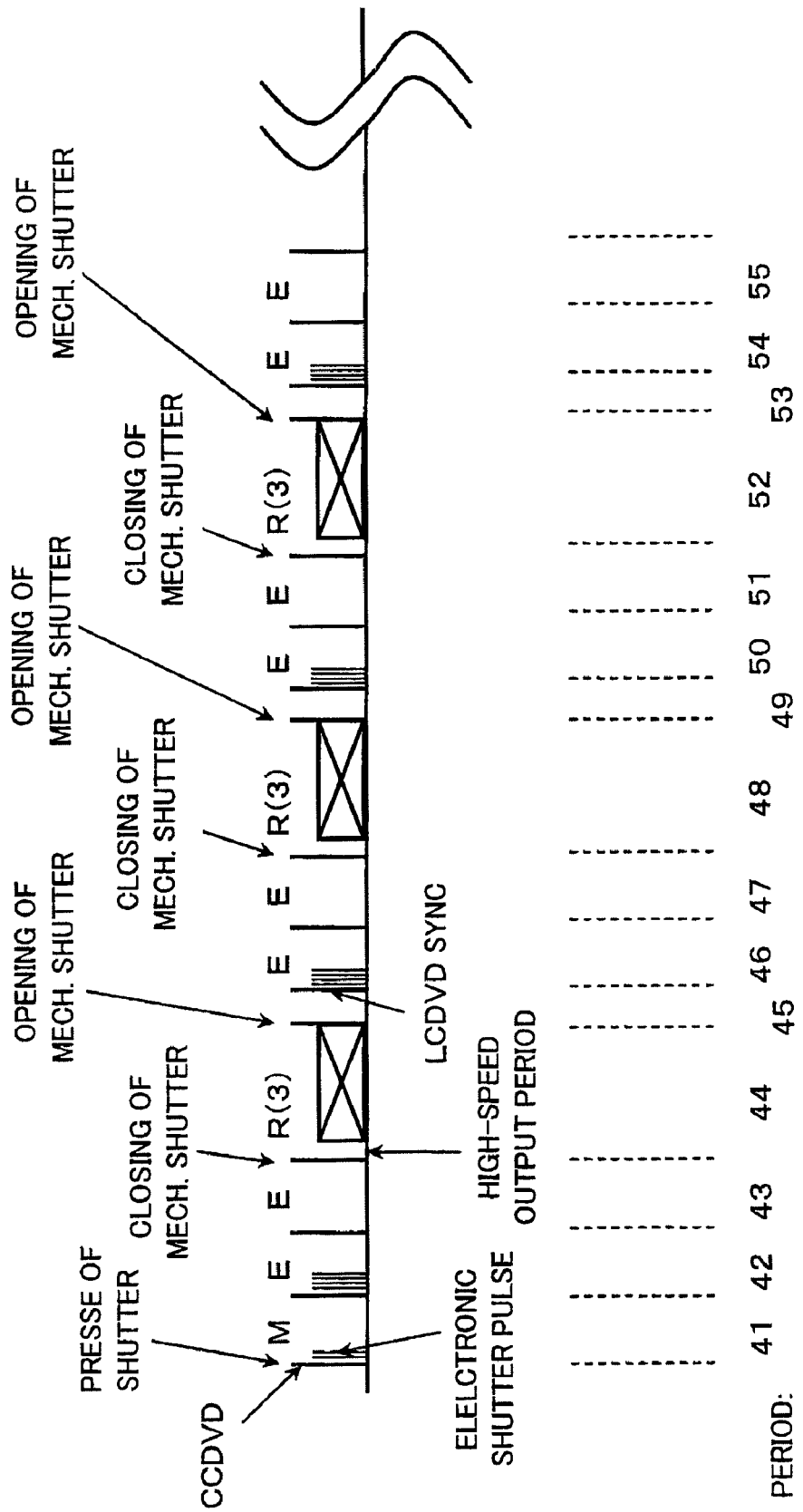
FIG. 7 is a timing chart showing an example of a shooting operation in high-speed continuous shooting mode (and 3-pixel mixing read mode).

FIG. 7 is a timing chart showing an example of a 3-pixel mixing readout operation in the high-speed continuous shooting mode. Period 41 is a monitoring period M which is the same as the period 1 in the normal continuous shooting mode (or the normal shooting mode) shown in FIG. 5, thus omitting description thereof. Periods 42 and 43 are exposure periods E, which are the same as the periods 2 and 3 in the normal continuous shooting mode (or the normal shooting mode) shown in FIG. 5, and thus, description thereof is omitted. When the period 43 ends, in preparation for beginning a readout period R(3), the mechanical shutter 102a is closed by the optical system controller 106d.

Period 44 is the readout period R(3), of which length is determined depending on the speed at which the CCD 102 outputs image signals. In the 3-pixel mixing readout in the high-speed continuous shooting mode, the pixel mixing controller 106c requests the CCD drive IC 111 for the 3-pixel mixing read mode (an example of the mixing read mode of the present invention) in which an image signal of a certain pixel of the CCD 102 is mixed with image signals of two pixels located above and below the certain pixel to be outputted. The CCD drive IC 111 drives the CCD 102 according to the request. Hence, the amount of image signal becomes a third. Accordingly, the length of the readout period R(3) is almost equal to the length of either one of the readout periods R(A), R(B), and R(C) in the normal continuous shooting mode (or the normal shooting mode) shown in FIG. 5. During the readout period R(3), the mechanical shutter 102a is being closed so that new image signals are not accumulated in the CCD 102. Note that at the beginning of the period 44 the residual charge in the vertical transfer lines is discharged at a high speed, achieving an improvement in the image quality of a shot image. The above-described operation provides the image signal for the first image. When the period 44 ends, the mechanical shutter 102a is opened by the optical system controller 106d in preparation for beginning an exposure period E for the second image.

Although in the example shown in FIG. 5 the 3-field drive is shown, generally the 3-pixel mixing readout is provided by 1-field drive. Therefore, during the high-speed continuous shooting mode, as shown in FIG. 7, it is sufficient to provide only the period R(3) as a readout period.

When image signals of a plurality of pixels (three pixels here) are mixed and read out, an image signal of each pixel is increased by an amount corresponding to the number of mixed pixels and thus the same effect as that obtained when the exposure time is increased can be obtained. Hence, the exposure time is reduced or an aperture mechanism (not shown) in the optical system 101 is closed to avoid overexposure. Such a pixel mixing readout allows not only the readout period but also the exposure time to be reduced.

Generally, the magnitude of the effect of a reduction in exposure time is determined by how many image signals of peripheral pixels of a certain pixel are mixed, and thus, the effect of a reduction in exposure time in the 3-pixel mixing readout is smaller than that in the 9-pixel mixing readout.

If the exposure time for obtaining correct exposure can be shortened, it may be possible to shorten the exposure period E by integral multiples of 1/30 second. For example, even though a subject has an exposure time for shooting which is 1/30 second or more and less than 1/15 second and an exposure period E of 2×CCDVD (1/15 second) during the normal continuous shooting mode, the subject may have the exposure time for shooting less than 1/30 second and the exposure period E of 1×CCDVD (1/30 second) to ensure sufficient correct exposure during the high-speed continuous shooting mode. Change in the exposure period E from 2×CCDVD (1/15 second) to 1×CCDVD (1/30 second) allows the time interval between one readout period R(9) and the next readout period R(9) to be reduced, producing an effect of reducing a continuous shooting interval.

On the other hand, for a subject which has an exposure time for shooting during the normal continuous shooting mode less than 1/30 second and an exposure period E ending at 1×CCDVD (1/30 second), although 1×CCDVD (1/30 second) is required as the exposure period E during the high-speed continuous shooting mode, the exposure time can be reduced by control of the electronic shutter than the exposure time in the normal continuous shooting mode. Reduction of the exposure time by the electronic shutter causes an effect of being able to suppress camera shake and subject shake. Note that although FIG. 4 shows an example in which an image signal of a certain pixel is mixed with image signals of two pixels located above and below the certain pixel and then the mixed image signal is read out, the number of pixels of which image signals are to be mixed can be changed.

Period 45 is a period for synchronizing the CCDVD and the LCDVD, which is the same as the period 7 shown in FIG. 5, and thus, description thereof is omitted. Periods 46 to 48 are the same as the periods 42 to 44, and when the period 48 ends, image signals for the second image are obtained. Thereafter, while the shutter button 108 is being pressed, shooting is repeated. Note that the pixel mixing controller 106*c* may monitor free space in the memory card 109, and switch automatically the read mode from the 3-pixel mixing read mode to the 9-pixel mixing read mode when the free space is smaller than a predetermined size.

3. Variations

In the present embodiment, independently on the normal shooting mode, the normal continuous shooting mode, and the high-speed continuous shooting mode, the residual charge in the vertical transfer lines is discharged in a high speed at the beginning of a readout period to improve the image quality of a shot image. However, high-speed discharge of the residual charge in the vertical transfer lines is not always necessary. Although during the normal shooting mode and the normal continuous shooting mode, high-speed discharge of the residual charge in the vertical transfer lines is performed, during the high-speed continuous shooting mode, high-speed discharge of the residual charge in the vertical transfer lines may not be performed, so that the continuous shooting speed can be further increased.

In the example of Table 1, during the normal continuous shooting mode the read mode is set to the normal read mode. However, during both the normal continuous shooting mode and the high-speed continuous shooting mode, that is, during the continuous shooting mode, the read mode may be set to the mixing read mode (the 9-pixel mixing read mode or the 3-pixel mixing read mode), as shown in Table 2. By this configuration, in the continuous shooting mode, a high-speed readout of image signal can be performed and degradation in the image quality of a shot image can be suppressed.

TABLE 2

| Shooting Mode | Read Mode |
| --- | --- |
| Normal Shooting Mode | Normal read mode |
| Continuous shooting mode (incl. normal continuous shooting/ high-speed continuous shooting) | Mixing read mode (9-pixel mixing readout or 3-pixel mixing readout) |

The number of pixels to be mixed in the mixing read mode executed in the continuous shooting mode may be specified by the user through the operation button 110 or may be fixed upon manufacturing of the digital camera 100. Alternatively, the default value of the number of pixels to be mixed may be set to nine, and the number of pixels to be mixed may be changed according to the amount of exposure. In the continuous shooting mode, the number of pixels to be mixed in the mixing read mode may be set to three during the normal continuous shooting mode, and the number of pixels to be mixed may be set to nine during the high-speed continuous shooting mode. In the continuous shooting mode, the read mode may be further switched to the normal read mode.

Although in the present embodiment a 3-pixel mixing readout and a 9-pixel mixing readout are enabled as mixing readout, the mixing readout is not limited thereto. The number of pixels to be mixed may be selected from larger numbers of pixels.

Although in the present embodiment, a period for synchronizing the CCDVD and the LCDVD is provided each time the image signal for one image is obtained. However, when the CCDVD and the LCDVD are not synchronized during a monitoring period, there is no need to provide a period for synchronizing the CCDVD and the LCDVD each time image signal for one image is obtained. This configuration allows the continuous shooting speed to be further increased.

In the present embodiment, a period for synchronizing the CCDVD and the LCDVD is provided each time the image signal for one image is obtained. However, a period for synchronizing the CCDVD and the LCDVD may be provided only once, after normal continuous shooting or high-speed continuous shooting is completed, i.e., after the image signals for a plurality of images are obtained. This configuration allows the continuous shooting speed to be further increased.

In the present embodiment, the mechanical shutter 101*a* is controlled to be closed at the time of the beginning of a readout period and to be opened at the time of the end of the readout period. However, since in the high-speed continuous shooting mode the number of times of driving the mechanical shutter 101*a* dramatically increases, the mechanical shutter 101*a* may not be controlled during the high-speed continuous shooting mode, taking into account the life of the mechanical shutter 101*a*.

INDUSTRIAL APPLICABILITY

According to the present invention, high-speed continuous shooting can be performed while suppressing degradation in the image quality of a shot image, and thus the present invention is useful and can be applied to an imaging apparatus such as a digital camera, a digital video camera, and a mobile phone with a camera.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2007-157212, filed on Jun. 14, 2007, which is expressly incorporated herein by reference in its entirety.

What is claimed is:

1. An imaging apparatus comprising a receiving unit that receives, when pressed, an instruction for shooting an image,
    wherein the imaging apparatus has, as a shooting mode, a normal shooting mode for generating one piece of still image data by one press of the receiving unit, and a continuous shooting mode for generating a plurality of pieces of still image data while the receiving unit is being pressed,
    wherein the imaging apparatus further comprises:
    a setting unit that sets the shooting mode;
    an imaging element including a plurality of pixels, and having, as a read mode, a normal read mode for outputting image signals of all pixels and a mixing read mode for mixing and outputting an image signal of a predetermined pixel and image signals of peripheral pixels of the predetermined pixel; and
    a pixel mixing controller that controls the read mode of the imaging element,
    wherein the continuous shooting mode includes a normal continuous shooting mode and a high-speed continuous shooting mode in which more pieces of image data are generated per unit time while the receiving unit is being pressed than in the normal continuous shooting mode, and wherein the pixel mixing controller controls the imaging element (i) to operate in the normal read mode when the shooting mode is set to the normal continuous shooting mode, and (ii) to operate in the mixing read mode when the shooting mode is set to the high-speed continuous shooting mode.

2. The imaging apparatus according to claim 1, wherein the number of the peripheral pixels to be mixed during the mixing read mode is variable in the imaging element, and the setting unit sets the number of the peripheral pixels to be mixed in the mixing read mode.

3. The imaging apparatus according to claim 1, wherein the number of the peripheral pixels to be mixed during the mixing read mode is variable in the imaging element, the setting unit sets a continuous shooting speed in the continuous shooting mode, and the pixel mixing controller sets the number of the peripheral pixels to be mixed in the mixing read mode according to the continuous shooting speed.

4. The imaging apparatus according to claim 1, wherein the number of the peripheral pixels to be mixed during the mixing read mode is variable in the imaging element, and the pixel mixing controller changes the number of the peripheral pixels to be mixed according to brightness of a subject.

5. The imaging apparatus according to claim 1 further comprising a storage unit that stores the still image data, wherein
the number of the peripheral pixels to be mixed during the mixing read mode is variable in the imaging element, and the pixel mixing controller changes the number of the peripheral pixels to be mixed according to free space of the storage unit.

6. The imaging apparatus according to claim 1, wherein the number of the peripheral pixels to be mixed in the mixing read mode is three or nine.

7. An imaging apparatus comprising a receiving unit that receives, when pressed, an instruction for shooting an image,
wherein the imaging apparatus has, as a shooting mode, a normal shooting mode for generating one piece of still image data by one press of the receiving unit, and a continuous shooting mode for generating a plurality of pieces of still image data while the receiving unit is being pressed,
wherein the imaging apparatus further comprises:
a setting unit that sets the shooting mode;
an imaging element including a plurality of pixels, and having, as a read mode, a normal read mode for outputting image signals of all pixels and a mixing read mode for mixing and outputting an image signal of a predetermined pixel and image signals of peripheral pixels of the predetermined pixel; and
a pixel mixing controller that controls the read mode of the imaging element,
wherein the pixel mixing controller can switch the read mode of the imaging element to one of the mixing read mode and the normal read mode according to the shooting mode set by the setting unit, when the shooting mode is set to the continuous shooting mode.

8. The imaging apparatus according to claim 7, wherein the number of the peripheral pixels to be mixed during the mixing read mode is variable in the imaging element, and the setting unit sets the number of the peripheral pixels to be mixed in the mixing read mode.

9. The imaging apparatus according to claim 7, wherein the number of the peripheral pixels to be mixed during the mixing read mode is variable in the imaging element, the setting unit sets a continuous shooting speed in the continuous shooting mode, and the pixel mixing controller sets the number of the peripheral pixels to be mixed in the mixing read mode according to the continuous shooting speed.

10. The imaging apparatus according to claim 7, wherein the number of the peripheral pixels to be mixed during the mixing read mode is variable in the imaging element, and the pixel mixing controller changes the number of the peripheral pixels to be mixed according to brightness of a subject.

11. The imaging apparatus according to claim 7 further comprising a storage unit that stores the still image data, wherein
the number of the peripheral pixels to be mixed during the mixing read mode is variable in the imaging element, and the pixel mixing controller changes the number of the peripheral pixels to be mixed according to free space of the storage unit.

12. The imaging apparatus according to claim 7, wherein the number of the peripheral pixels to be mixed in the mixing read mode is three or nine.

13. An imaging apparatus comprising a receiving unit that receives, when pressed, an instruction for shooting an image,
wherein the imaging apparatus has, as a shooting mode, a normal shooting mode for generating one piece of still image data by one press of the receiving unit, and a continuous shooting mode for generating a plurality of pieces of still image data while the receiving unit is being pressed,
wherein the imaging apparatus further comprises:
a setting unit that sets the shooting mode;
an imaging element including a plurality of pixels, and having, as a read mode, a normal read mode for outputting image signals of all pixels and a mixing read mode for mixing and outputting an image signal of a predetermined pixel and image signals of peripheral pixels of the predetermined pixel; and
a pixel mixing controller that controls the read mode of the imaging element,
wherein the pixel mixing controller controls the imaging element to operate in the mixing read mode when the shooting mode is set to the continuous shooting mode, and
wherein the number of the peripheral pixels to be mixed during the mixing read mode is variable in the imaging element, the setting unit sets a continuous shooting speed in the continuous shooting mode, and the pixel mixing controller sets the number of the peripheral pixels to be mixed in the mixing read mode according to the continuous shooting speed.

14. An imaging apparatus comprising a receiving unit that receives, when pressed, an instruction for shooting an image,
wherein the imaging apparatus has, as a shooting mode, a normal shooting mode for generating one piece of still image data by one press of the receiving unit, and a continuous shooting mode for generating a plurality of pieces of still image data while the receiving unit is being pressed,
wherein the imaging apparatus further comprises:
a setting unit that sets the shooting mode;

an imaging element including a plurality of pixels, and having, as a read mode, a normal read mode for outputting image signals of all pixels and a mixing read mode for mixing and outputting an image signal of a predetermined pixel and image signals of peripheral pixels of the predetermined pixel; and a pixel mixing controller that controls the read mode of the imaging element, wherein the pixel mixing controller controls the imaging element to operate in the mixing read mode when the shooting mode is set to the continuous shooting mode, and wherein the number of the peripheral pixels to be mixed during the mixing read mode is variable in the imaging element, and the pixel mixing controller changes the number of the peripheral pixels to be mixed according to brightness of a subject.

15. An imaging apparatus comprising a receiving unit that receives, when pressed, an instruction for shooting an image, wherein the imaging apparatus has, as a shooting mode, a normal shooting mode for generating one piece of still image data by one press of the receiving unit, and a continuous shooting mode for generating a plurality of pieces of still image data while the receiving unit is being pressed, wherein the imaging apparatus further comprises:

a setting unit that sets the shooting mode;

an imaging element including a plurality of pixels, and having, as a read mode, a normal read mode for outputting image signals of all pixels and a mixing read mode for mixing and outputting an image signal of a predetermined pixel and image signals of peripheral pixels of the predetermined pixel;

a pixel mixing controller that controls the read mode of the imaging element; and a storage unit that stores the still image data, wherein the pixel mixing controller controls the imaging element to operate in the mixing read mode when the shooting mode is set to the continuous shooting mode, and wherein the number of the peripheral pixels to be mixed during the mixing read mode is variable in the imaging element, and the pixel mixing controller changes the number of the peripheral pixels to be mixed according to free space of the storage unit.

16. An imaging apparatus comprising a receiving unit that receives, when pressed, an instruction for shooting an image, wherein the imaging apparatus has, as a shooting mode, a normal shooting mode for generating one piece of still image data by one press of the receiving unit, and a continuous shooting mode for generating a plurality of pieces of still image data while the receiving unit is being pressed, wherein the imaging apparatus further comprises:

a setting unit that sets the shooting mode;

an imaging element including a plurality of pixels, and having, as a read mode, a normal read mode for outputting image signals of all pixels and a mixing read mode for mixing and outputting an image signal of a predetermined pixel and image signals of peripheral pixels of the predetermined pixel; and a pixel mixing controller that controls the read mode of the imaging element, wherein the pixel mixing controller controls the imaging element to operate in the mixing read mode when the shooting mode is set to the continuous shooting mode, and wherein the number of the peripheral pixels to be mixed in the mixing read mode is three or nine.

* * * * *